United States Patent [19]

Sakamoto et al.

[11] Patent Number: 4,946,230
[45] Date of Patent: Aug. 7, 1990

[54] METHOD AND AN APPARATUS FOR CHARGING AN ANTI-LOCK BRAKE SYSTEM WITH BRAKE LIQUID

[75] Inventors: Shunji Sakamoto, Higashihiroshima; Kunji Kimura, Hiroshima, both of Japan

[73] Assignee: Mazda Motor Corporation, Hiroshima, Japan

[21] Appl. No.: 343,559

[22] Filed: Apr. 27, 1989

[30] Foreign Application Priority Data

Apr. 27, 1988 [JP] Japan .................... 63-105113

[51] Int. Cl.$^5$ .................... B60T 8/32; B60T 11/30
[52] U.S. Cl. .................... 303/113; 188/352; 303/12
[58] Field of Search .............. 303/113, 114, 115, 116, 303/117, 119, 61, 68–69, 12; 188/352

[56] References Cited

U.S. PATENT DOCUMENTS

| | | | |
|---|---|---|---|
| 3,520,136 | 7/1970 | Stiward | 188/352 |
| 4,162,108 | 7/1979 | Shimizu | 303/115 |
| 4,188,074 | 2/1980 | Yama et al. | 303/92 |
| 4,269,456 | 5/1981 | Kondo et al. | 303/115 |
| 4,415,071 | 11/1983 | Butler et al. | 188/352 |
| 4,418,803 | 12/1983 | Chichester | 188/352 |
| 4,568,131 | 2/1986 | Blomberg et al. | 303/61 X |
| 4,702,532 | 10/1987 | Anderson | 188/352 X |
| 4,821,770 | 4/1989 | Parrott et al. | 303/119 X |

FOREIGN PATENT DOCUMENTS 60-35099 2/1985 Japan .
62-16393 1/1987 Japan .

Primary Examiner—Douglas C. Butler
Attorney, Agent, or Firm—Fleit, Jacobson, Cohn, Price, Holman & Stern

[57] ABSTRACT

A method and an apparatus for charging a brake system with brake liquid, when the brake system includes an anti-lock brake device, utilizes vibration generated by a motor of the anti-lock brake device to eliminate small amounts of liquid which may remain trapped during the discharge of air from the passages of the brake system and which can prevent complete removal of air from the system. After the air discharge has finished, brake liquid is supplied into the brake system.

11 Claims, 6 Drawing Sheets

METHOD AND AN APPARATUS FOR CHARGING AN ANTI-LOCK BRAKE SYSTEM WITH BRAKE LIQUID

BACKGROUND OF THE INVENTION

1. Field of the Invention

The present invention relates generally to a method and an apparatus for discharging air from and supplying brake liquid to a brake system, and more particularly, to a brake system with an anti-lock brake device.

2. Description of Prior Art

Preventing the presence of air in a vehicle brake liquid passage in a vehicle brake system is important in order to improve brake performance. One practical way of eliminating air from such a system is to discharge air from the brake liquid passage by a vacuum pump before supplying or charging brake liquid to the system, as shown in Japanese Utility Model Laid-Open Application No. 60-35099.

Another practical way is to adopt a pumping operation which repeats depressing and releasing of a brake pedal so that brake liquid is filled up into the brake system without being compressed. Air mixed and compressed in the brake liquid can be removed from an inside wall of a wheel cylinder by expansion of the wheel cylinder, as shown in the Japanese Patent Laid-Open Application No. 62-16393.

An anti-lock brake device which prevents a vehicle from skidding or slipping by precisely controlling brake application to the wheels of the vehicle so that they do not lock has recently been introduced. This anti-lock brake device has complicated brake piping which consists, of main brake piping connecting a master cylinder and a wheel cylinder, and sub-brake piping interposed in the main brake piping and controlling the liquid pressure of the main brake piping. In this anti-lock brake device, air in the main brake piping cannot be removed as expected, even if above-mentioned methods are used, because of complicated piping. This can cause serious braking problems.

SUMMARY OF THE INVENTION

It is therefore an object of the present invention to provide a method and an apparatus for charging a brake system with liquid when an anti-lock device is included in the braking system. Air which remains in the system may be discharged thoroughly from main brake piping of the brake system by causing a pulsing vibration in the fluid present in the brake system.

BRIEF DESCRIPTION OF THE DRAWINGS

The accompanying drawings show a preferred embodiment of the present invention, in which.

DETAILED DESCRIPTION OF THE PREFERRED EMBODIMENT

Figure 1:
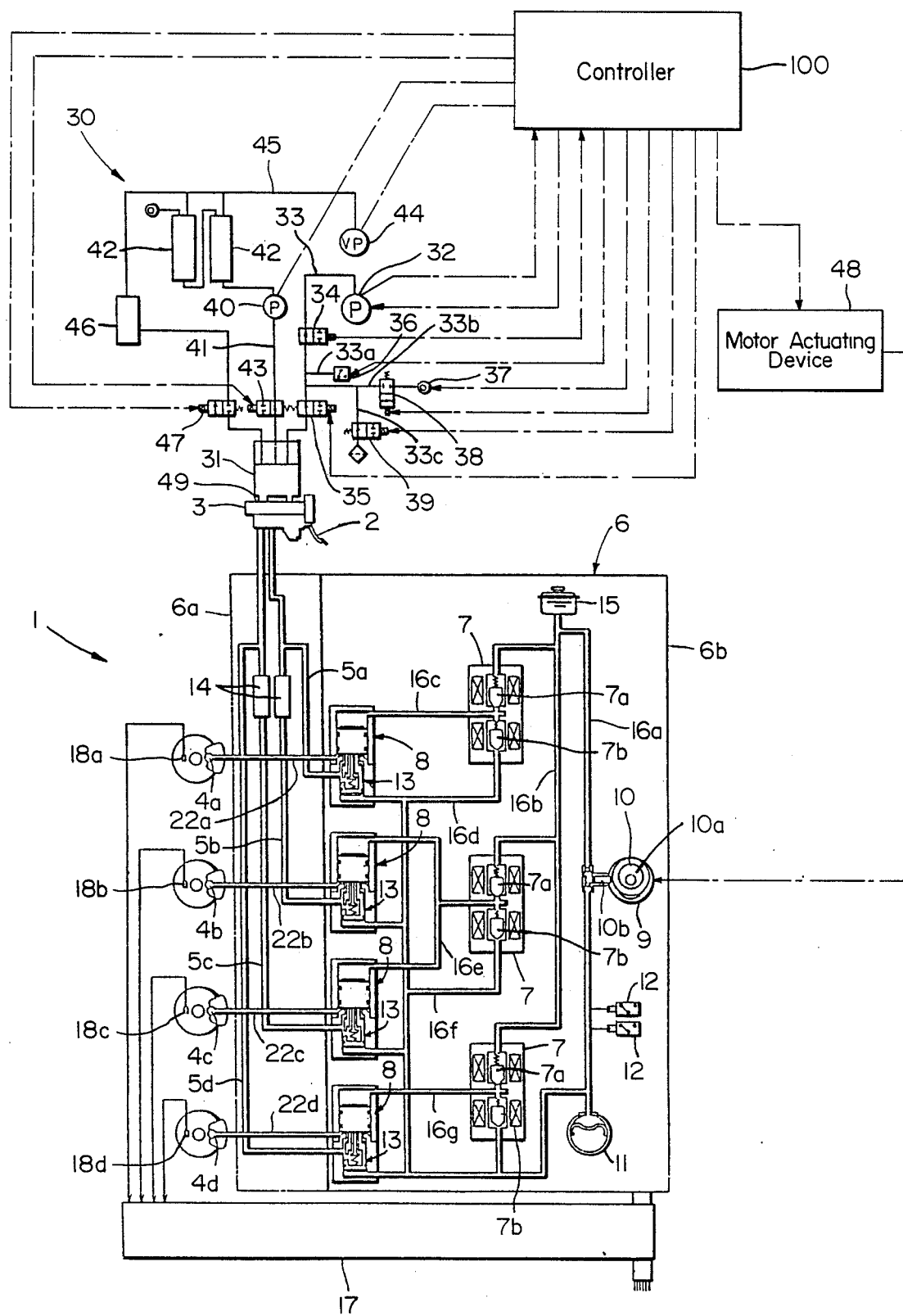
FIG. 1 shows a schematic diagram of a brake liquid charging system of a brake system with an anti-lock device according to the present invention.
Figure 2:
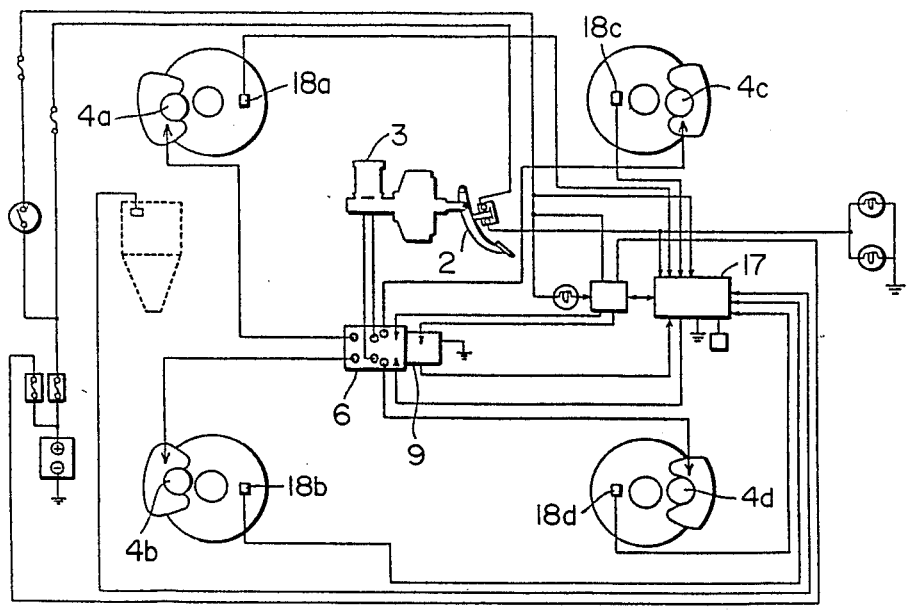
FIG. 2 shows a schematic diagram of the brake system with the anti-lock device.
Figure 3:
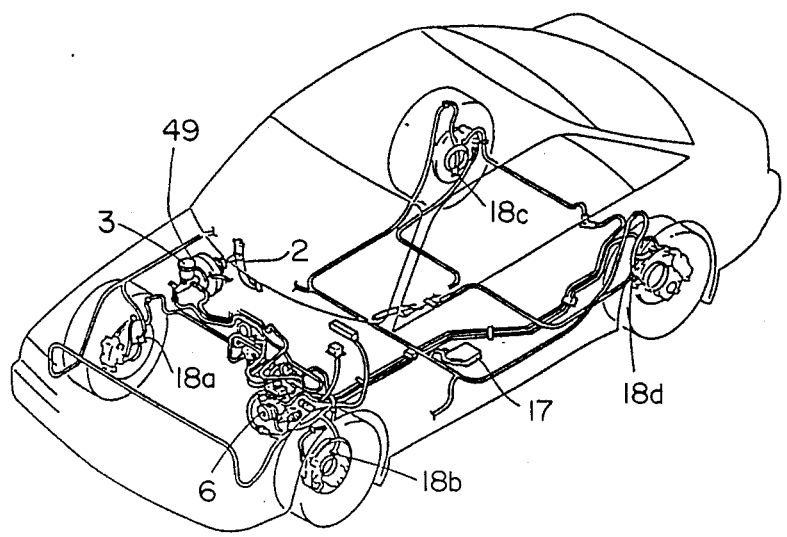
FIG. 3 shows a schematic diagram of an automobile equipped with the brake system.

Referring now to the drawings, reference numeral 1 denotes a brake system with an anti-lock brake device, and is hereinafter designated as ABS brake system 1. The ABS brake system 1 comprises a brake pedal 2, a master cylinder 3 which generates liquid pressure in accordance with pressing force applied on the brake pedal 2, and wheel cylinders 4a, 4b, 4c and 4d, each providing brake force to an individual wheel. A hydraulic unit 6 includes main brake piping 6a and secondary or sub-brake piping 6b. The main brake piping 6a comprises upstream liquid passages 5a, 5b, 5c, and 5d and downstream liquid passages 22a, 22b, 22c and 22d which communicate the master cylinder 3 with wheel cylinders 4a, 4b, 4c and 4d, respectively. The sub-brake piping 6b is interposed between the upstream liquid passages and the wheel cylinders. The sub-brake piping controls liquid pressures acting on the wheel cylinders 4a, 4b, 4c and 4d.

The hydraulic unit 6 further comprises three solenoid valves 7, four ABS valves 8, one of which is interposed between each of the upstream liquid passages 5a, 5b, 5c and 5d and the downstream liquid passages 22a, 22b, 22c and 22d, respectively, a pump 10 generating liquid pressure to actuate the ABS valves 8, a motor 9 actuating the pump 10, an accumulator 11, pressure switches 12, sub-liquid passages 16a, 16b, 16c, 16d, 16e, 16f and 16g, and a reservoir 15. Schematically illustrated proportioning valves 14 are provided in the upstream liquid passages 5b and 5c. As is most clearly apparent from FIGS. 7(a)–7(d), each ABS valve 8 consists of a piston 8a, a cylinder 8b and a cut-off valve 13. The cut-off valve 13 in turn includes a first cut-off valve 13a and a second cut-off valve 13b.

The hydraulic unit 6 is controlled by an electric unit 17. Each wheel of the vehicle is individually provided with a speed sensor, designated 18a, 18b, 18c and 18d. Each speed sensor detects a rotational speed of the wheel with which it is associated, and generates an electric signal This electric signal is input to the electric unit 17.

The ABS brake system 1 operates as follows. At first, the speed sensors 18a, 18b, 18c and 18d detect the individual rotational speeds of the wheels and calculate signals based on the detected speeds The signals are then input to electric unit 17 which, based upon the signals received from the speed sensors, calculates a value representative of an assumed wheel condition by a predetermined theoretical formula. After the determination of a wheel condition, the electric unit 17 controls the motor 9 and the solenoid valves 7 to actuate the pistons 8a and the cut-off valves 13 according to the value representative of the assumed wheel condition. Thus, liquid pressures applied to the wheel cylinders 4a, 4b, 4c and 4d are controlled so as to prevent each wheel from locking. Oil is preferably used as the brake liquid in the hydraulic system. Other available liquids may also be used.

The behavior of the pistons 8a and the cut-off valves 13 will now be described. Referring to FIGS. 7(a) through 7(d), the piston 8a and the second cut-off valve 13b are shifted in an axial direction of the cylinder 8b. Liquid pressure accumulates in the accumulator 11, so that the liquid pressure at each wheel cylinder is controlled and occupies one of a plurality of states, including a so-called normal state, a depressurized state, a holding state and a pressurized state. To control the pressure at each wheel cylinder, the piston $8a$ is moved in response to the accumulator pressure controlled by solenoid valves 7. Solenoid valves 7 each consists of an exit solenoid valve $7a$, acting to decrease liquid pressure of each wheel cylinder, and an inlet solenoid valve $7b$, acting to increase the same liquid pressure. The first cut-off valve $13a$ cooperates with the piston $8a$ to open or shut the passage of the main brake piping $6a$. The second cut-off valve $13b$ cooperates with the cylinder $8b$ to open or shut the passage of the main brake piping $6a$.

FIG. 7($a$) shows a non-operating condition where liquid accumulated in the reservoir 11 is not pressurized. FIGS. 7($b$), 7($c$) and 7($d$) show, respectively, a depressurized condition, a pressurized condition and a holding condition, where pressurized liquid is accumulated in the reservoir 11 and its supply or charge to an actuation chamber 21 and its discharge from the same are controlled by the exit solenoid valve $7a$ and the inlet solenoid valve $7b$.

Figure 5:
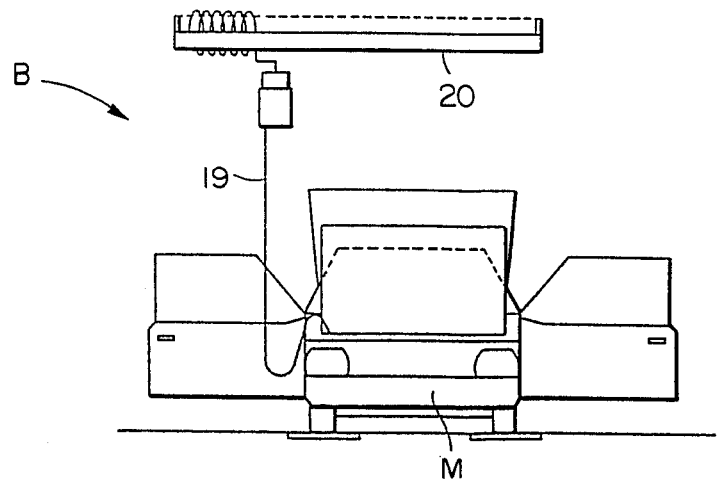
FIGS. 5 and 6 show schematic diagrams of a brake liquid charging, station.
Figure 6:
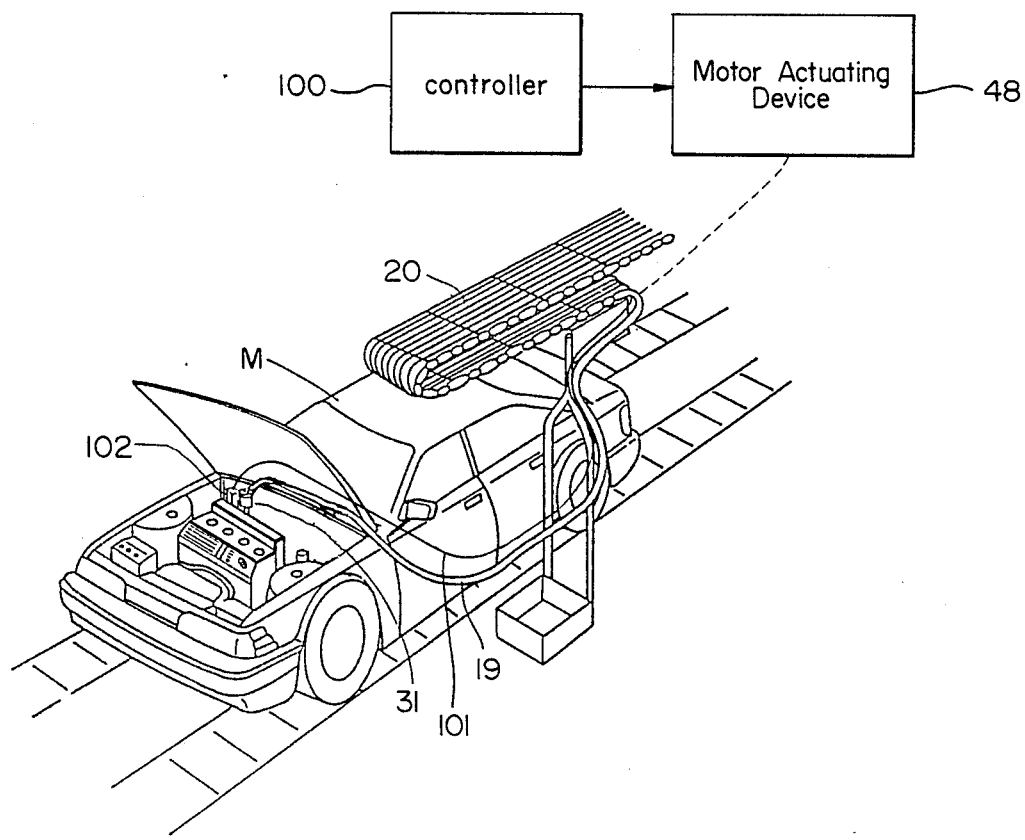
Figure 7A:
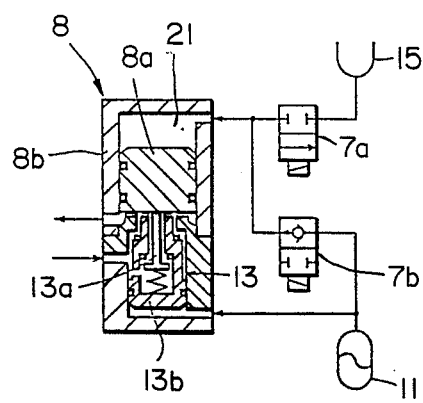
FIGS. 7(a), 7(b), 7(c) and 7(d) show various states of an anti-lock brake device in operation.
Figure 7B:
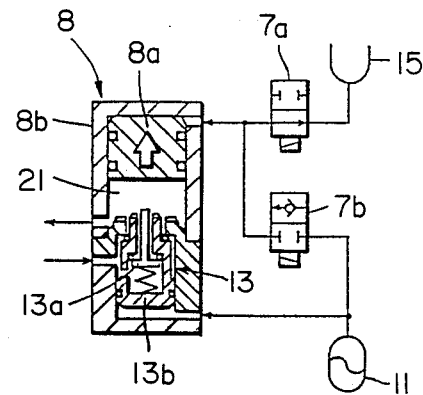
Figure 7C:
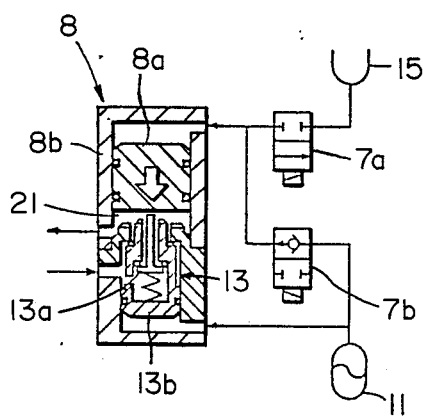
Figure 7D:
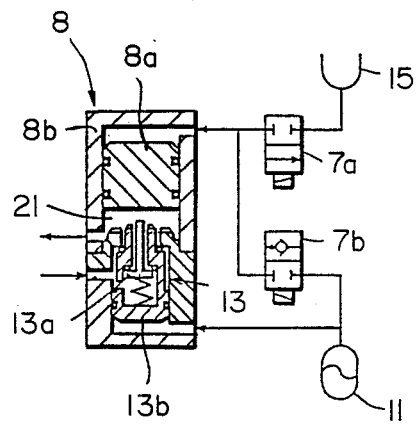

Referring now to FIGS. 1, 5 and 6, a brake liquid charging apparatus 30 has a brake gun 31 by which main brake piping $6a$ is charged with brake liquid. The brake gun 31 has a hose 19 which is guided by a rail 20 disposed horizontally at a high upper portion of a brake liquid charging station B, so that the gun 31 can be inserted in a brake liquid supply opening 49 on the master cylinder 3 of an automobile M conveyed to the station B. A vacuum pump 32 is connected with the brake gun 31 by means of a vacuum pipe 33. A first solenoid valve 34 and a second solenoid valve 35 are interposed in the vacuum pipe 33 A pressure gauge 36 is connected to the vacuum pipe 33 by way of a first bifurcated pipe $33a$. A compression pump 37 is connected with the vacuum pipe 33 by way of a second bifurcated pipe $33b$, which is provided with a third solenoid valve 38. The second bifurcated pipe $33b$ is communicated with the atmosphere by way of a third bifurcated pipe $33c$, which is provided with a fourth solenoid valve 39.

Discharge of air from hydraulic unit 6 by the vacuum pump 32 is performed before the main brake piping $6a$ is charged with brake liquid by the brake gun 31. To discharge the air, the first and the second solenoid valves 34, 35 are demagnetized so that they open, the third solenoid valve 38 is demagnetized so that it closes, and the fourth solenoid valve 39 is magnetized so that it closes. Air remaining in the main brake piping $6a$ can thus be discharged upon the actuation of the vacuum pump 32.

A brake liquid charging pump 40 is connected with the brake gun 31 by a brake liquid supply pipe 41, which is provided with a fifth solenoid valve 43. Two brake liquid reservoirs 42 are connected with the brake liquid charging pump 40. When the fifth solenoid valve 43 is demagnetized so that it opens, brake liquid can be supplied to the brake gun 31 by the brake liquid charging pump 40. Hence, brake liquid is charged or supplied into the main brake piping $6a$ in response to an operation of the brake gun 31.

A brake liquid collecting pump 44 is connected with the brake gun 31 by a brake liquid collecting pipe 45. Brake liquid collecting reservoir 46, to collect brake liquid, and a sixth solenoid valve 47 are interposed in collecting pipe 45.

The brake liquid reservoirs 42 are connected to the brake liquid collecting pipe 45 between the brake liquid collecting pump 44 and the brake liquid collecting reservoir 46, so that collected liquid in the brake liquid collecting reservoir 46 can be supplied to the brake liquid reservoirs 42. That is, the second solenoid valve 35 is demagnetized to open, the third solenoid valve 38 is magnetized to open and the sixth solenoid valve 47 is magnetized to open, so that excess brake liquid in the main brake piping $6a$ is discharged from the main brake piping to the brake liquid collecting reservoir 46 by the compression pump 37 and the brake liquid collecting pump 44.

Vacuum pump 32 is connected to a motor actuating device 48 through a controller 100, which receives an actuating signal from the vacuum pump 32. Controller 100 in turn sends a signal to device 48, which in turn sends out an actuating signal to the motor 9 in the ABS system 1.

The motor 9 and the pump 10 are installed so that they are integrally formed with or rigidly connected to the sub-brake piping $6b$, solenoid valves 7, and ABS valves 8 in the hydraulic unit 6. Accordingly, if the motor 9 actuates the pump 10, pulsations or vibrations caused by the pump are transmitted from the pump to everywhere in the hydraulic unit 6. The pump 10 has a cam $10a$ and a plunger $10b$. By rotating the motor 9, the cam $10a$ actuates the plunger $10b$ so that it reciprocates repeatedly, causing the pulsations or vibrations.

The sub piping $6b$ is assembled beforehand. Actuating liquid is filled in the sub liquid passages $16a$, $16b$, $16c$, $16d$, $16e$, $16f$ and $16g$ without being pressurized.

The motor actuating device 48 is fixed to the station B. An electrical cord 101 is located adjacent to the hose 19 and connects the motor actuating device 48 to the hydraulic unit 6 by a coupler 102.

Controller 100 actuates solenoid valves 34, 35, 38, 39, 43 and 47 and pumps 32, 40 and 44. Controller 100 also includes means for detecting and receiving an actuating signal from the vacuum pump 32 and a signal from the pressure gauge 36.

Figure 4:
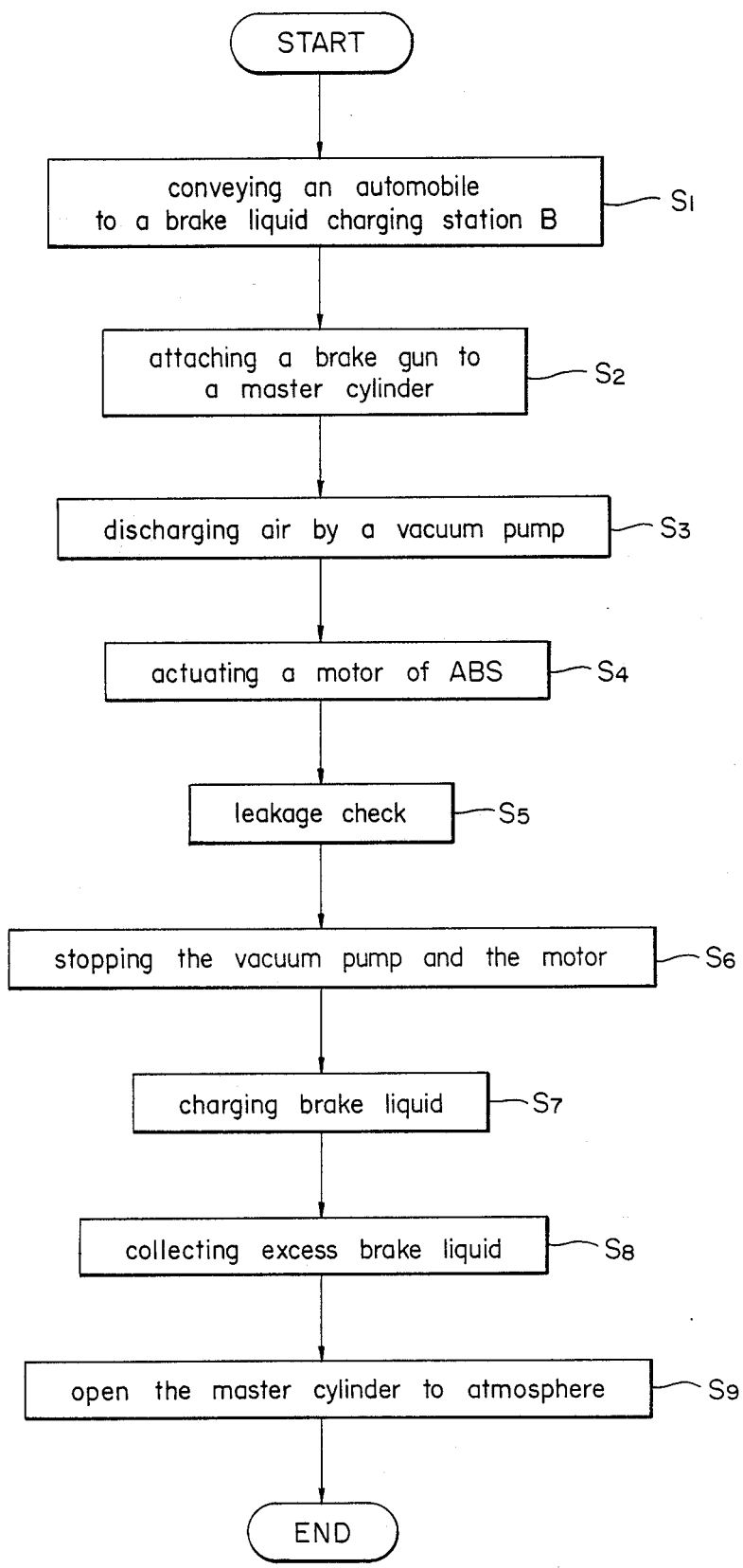
FIG. 4 shows a flow chart illustrating the process for charging the brake system with brake liquid.

Referring now to FIG. 4, processes for charging hydraulic unit 6 with brake liquid will be described.

Figure 8:
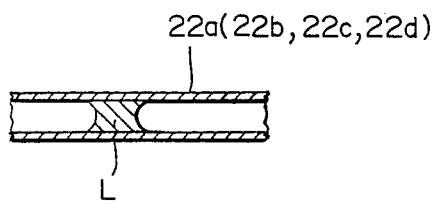
FIG. 8 shows a liquid passage in which a small amount liquid is retained.

At a step $S_1$, the automobile M is conveyed to the brake liquid charging station B as shown FIGS. 5 and 6, and the hose 19 is guided by the rail 20 to move toward the automobile M. The brake gun 31 can then be coupled or engaged with the brake liquid supply opening 49 in the master cylinder 3 of the automobile M. At a step $S_2$, the brake gun 31 is attached firmly to the brake liquid supply opening 49. At a step $S_3$, the vacuum pump 32 is actuated to discharge remaining air in the main brake piping $6a$ from the hydraulic unit During this step, the first and the second solenoid valves 34, 35 are demagnetized to open, the third solenoid valve 38 is demagnetized to close, the fourth solenoid valve 39 is magnetized to close, the fifth solenoid valve 43 is magnetized to close, and the sixth solenoid valve 47 is demagnetized to close. At a step $S_4$, the motor actuating device 48 actuates the motor 9 in response to the actuation signal of the vacuum pump 32 so as to cause a pulse or vibration in the fluid in main brake piping $6a$. At this time, the piston $8a$, the first cut-off valve $13a$ and the second cut-off valve $13b$ are held in the state illustrated in FIG. 7($a$). Therefore, the upstream liquid passages $5a$ to $5d$ and the downstream liquid passages $22a$ to $22d$ are opened or communicated with each other, and thus, air in the main brake piping $6a$ can be discharged. As shown in FIG. 8, if a small amount of liquid L, such as water or oil, remains trapped in the downstream liquid passages 22a to 22d or in the passages of the cut-off valve 13, air passage may be blocked or closed off by the liquid L. In particular, if the passages of the cut-off valve 13 are small and complicated, liquid L is likely to remain trapped therein. In this case, the discharge of air from hydraulic unit 6 may be incomplete. However, the vibration generated by the motor 9 assures that the trapped liquid L is removed so that the passages of the main brake piping 6a are opened and communicate thoroughly with each other.

Thereafter, at a step S$_5$, the first solenoid valve 34 is magnetized to close the vacuum pipe 33 so as to stop the discharge of air from the main brake piping 6a. A leakage check is then done by using the pressure gauge 36 to detect whether or not air is sufficiently discharged from unit 6. At a step S$_6$, the vacuum pump 32 is stopped. The motor 9 is stopped in response to the stopping of vacuum pump 32 by a signal from the motor actuating device 48.

Subsequently, at a step S$_7$, the fifth solenoid valve 43 is demagnetized to open and the second solenoid valve 35 is magnetized to close. The brake liquid charging pump 40 is actuated to supply brake liquid to the brake gun 31. Brake liquid is charged or supplied into the main brake piping 6a according to the operation of the brake gun 31.

At a step S$_8$, when a predetermined amount of brake liquid has been supplied, the brake liquid charging pump 40 is stopped. The fifth solenoid valve 43 is then magnetized to close, the second solenoid valve 35 is demagnetized to open, the third and the sixth solenoid valves 38, 47 are magnetized to open. In this condition, the compression pump 37 and the brake liquid collecting pump 44 are actuated to collect excess liquid from the main brake piping 6a and supply the collected liquid to the brake liquid collecting reservoir 46.

At a step S$_9$, the compression pump 37 is stopped, and the third solenoid valve 38 is demagnetized to stop supplying compressed air. After the sixth solenoid valve 47 is demagnetized to close, the fourth solenoid valve 39 is demagnetized to open so that the interior of the master cylinder 3 is opened to the atmosphere. Charging the hydraulic unit 6 with brake liquid is finished by removing the brake gun 31 from the brake liquid supply opening 49 of the master cylinder 3.

This invention may be embodied in other specific forms without departing from the spirit or essential characteristics thereof. The present embodiment is therefore to be considered in all respects as illustrative and not restrictive, the scope of the invention being defined by the appended claims rather than by the foregoing description. All changes which come within the meaning and range of equivalency of the claims are therefore intended to be embraced therein.

What is claimed:

1. A method for supplying brake liquid to a brake system provided with an anti-lock brake device, comprising the steps of:
    discharging air in brake piping by discharging means;
    vibrating the fluid in the brake system by actuating a motor for the anti-lock brake device after the air is discharged; and
    charging the brake piping with brake liquid after the air has been discharged.

2. A method as claimed in claim 1, and further comprising the step of stopping said motor before charging the brake piping with brake liquid.

3. A method as claimed in claim 1, wherein the steps of discharging air and of vibrating the brake system are performed substantially simultaneously.

4. A method as claimed in claim 1, wherein said motor is actuated in response to actuation of the discharging means.

5. A method as claimed in claim 1, and further comprising the step of detecting whether or not the air has been discharged from the brake piping by a leakage check.

6. A method as claimed in claim 1, and further comprising the step of collecting excess brake liquid from the brake piping.

7. An apparatus for charging brake liquid to a brake system provided with an anti-lock brake device, comprising:
    main brake piping means for connecting a master cylinder to wheel cylinders provided on wheels of a vehicle;
    sub-brake piping means for controlling liquid pressure in the main brake piping means;
    valve means in said sub-brake piping means interposed between said master cylinder and said wheel cylinders for opening and closing a passage of the main brake piping means;
    discharging means for discharging air in the main brake piping means,
    charging means for supplying brake liquid to the main brake piping means after the air has been discharged;
    motor means for the anti-lock brake device for generating liquid pressure in the sub-brake piping means; and
    control means for actuating the motor means to cause a vibration of the valve means while the discharging means is discharging air.

8. An apparatus as claimed in claim 7, wherein said control means includes motor actuating means for actuating the motor means based on actuation of the discharging means.

9. An apparatus as claimed in claim 8, wherein said discharging means comprises a vacuum pump.

10. An apparatus as claimed in claim 7, wherein said discharging means includes a vacuum pump and a vacuum pipe, said charging means includes a charging pump and a charging pipe, and the vacuum pipe and the charging pipe are connected at their ends to a brake gun which is attachable to the master cylinder.

11. An apparatus as claimed in claim 7, and further comprising collecting means for collecting excess brake liquid, said collecting means having a collecting reservoir and a collecting pipe connected to the brake gun.

* * * * *